3,019,098
METHOD OF ENHANCING PLANT GROWTH EMPLOYING AURINTRICARBOXYLIC ACID AND SALTS THEREOF
John B. Hemwall, Long Beach, Calif., assignor to The Dow Chemical Company, Midland, Mich., a corporation of Delaware
No Drawing. Filed Nov. 20, 1958, Ser. No. 775,112
7 Claims. (Cl. 71—1)

The present invention relates to plant agronomy and particularly relates to improving growth of plant life in soil.

Many types of earth soils are substantially useless for the growth of vegetable and plant life therein, typical of such soils being those of rocky types, shales, basalts and limestone character. Such soils or potential soil material are present in the earth's crust in huge amounts but they have heretofore been unavailable, from a practical standpoint, for the useful and economical growth of vegetable and plant life therein.

The basic importance of soil in food production requires that attention be directed to chemical composition of soil in relation to crop needs and particularly to availability of the elements to the plants. Plants are able to utilize only a small fraction of the total quantity of any element present in soils. Although many primary minerals may be considered storehouses of plant nutrients, the release of elements is often not sufficiently rapid in the weathering process to support intensive crop production. Among the soil components essential for plant growth is phosphorus. The phosphorus is present in soil in both organic and in inorganic combinations. Although it is present preponderantly in inorganic combination, it may be found in organic combination from as little as 3 percent in some soils to as much as 75 percent in other soils. In organic combination, phosphorus occurs in phospholipids, nucleic acids, inositol phosphates, phosphoproteins, etc. In inorganic combination, the phosphorus occurs substantially completely as salts of orthophosphoric acid.

Phosphorus, to be beneficial to the plant, must be absorbed from the soil by the plant root system. The understanding of the processes taking place during the uptake of phosphorus is still incomplete but it has been observed that the plant response to phosphorus is a function of the solubility of the phosphorus present and it is believed that the anionic form $H_2PO_4^-$ is the form most utilized by the plants. It has further been observed that any factor altering this solubility will alter plant growth. Phosphorus as well as other minerals in the soil are frequently "fixed," i.e., the readily soluble plant nutrients are changed to less soluble forms by reaction with inorganic or organic components of the soil; with the result that the nutrients become restricted in their mobility in the soil and suffer a decrease in availability to plants. Routes whereby the nutrient elements become fixed have been postulated as chemical or physical adsorption and double decomposition. It is generally accepted that more than one route is involved in the fixation process. It is desirable in the practice of agronomy that a method may be found to make the "fixed" phosphorus more available for plant nutrition. Furthermore, it is desirable to prevent or to slow down this fixation of phosphorus and to maintain the phosphorus in a form available to plants.

It has been found according to the present invention, that by the addition of small quantities of an aurintricarboxylic acid compound to growth medium, plants are benefited, this benefit manifesting itself in more rapid growth, earlier maturity, healthier plants, and greater yields. It has also been found that by the addition of an aurintricarboxylic acid compound that phosphorus is made available and maintained available in a form assimilable by plant life. It has further been found that by the practice of the present invention, the phosphorus uptake from soil by plants is enhanced. Furthermore, it has been found that by the incorporation of the aurintricarboxylic acid compound that the phosphorus made available to the plant is greater than the effect obtained by doubling the amount of phosphate fertilizer added to the soil.

The aurintricarboxylic acid compounds suitable for practice of this invention are defined as those having the structure

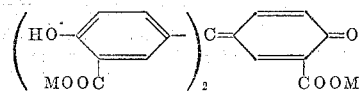

wherein M is hydrogen or ammonium.

These aurintricarboxylic acid compounds are solids. They may be applied to growth medium in any suitable form and by any means, usually employed for administration of organic chemicals to growth medium. By the expression "growth medium" is meant any medium suitable for the planting and growing of vegetables and plant life. Thus, the expression is meant to encompass not only soil but also sand, liquid nutrient medium and "synthetic soil" compositions such as sponge rock, peat, etc. and material sold under trade names such as "Black Magic." However, the invention primarily is concerned with the application of aurintricarboxylic acid compounds to natural soil. Included in the expression "natural soil" is a range of soil compositions from that which contains predominantly mineral matter to that which is relatively high in organic matter. In the practice of this invention the aurintricarboxylic acid compound may be added to acid or alkaline soil, to highly calcareous soil or soil containing as much as from 50 to 80 percent organic matter. It is suitable for use in both sandy soil and in heavy clay soil.

In carrying out the operation in accordance with the present invention, the aurintricarboxylic acid compound is distributed in plant growth media. It may be distributed in an unmodified form but is preferably intimately dispersed in a carrier with or without the inclusion of other additaments. By "carrier" is meant any solid or liquid agent with which the aurintricarboxylic acid compound may be employed. Thus, the carrier may be water, aqueous dispersions, organic liquid carriers, solid fertilizers, an aqueous fertilizer composition or inert dust. Administration to the soil of the aurintricarboxylic acid compound as a constituent of phosphate containing fertilizer compositions constitutes a preferred embodiment of the present invention.

In applications to growth media, good results are obtained when the aurintricarboxylic acid compound is supplied in an amount of from 0.25 to 250 parts or more per million parts by weight of the medium. In applications to soil, good results are obtained when the aurintricarboxylic acid compound is distributed at a rate of from 1 to 20 pounds or more per acre and through such cross-section of the soil as to provide for the presence therein of an effective concentration of the aurintricarboxylic acid compound. The required amounts of aurintricarboxylic acid compound may be supplied in from 1 to 100 gallons of organic solvent carrier in from 1 to 27,000 or more gallons of aqueous carrier, or in from about 20 to 2,000 pounds or more of solid carrier per acre, treated. When an organic solvent carrier is employed, it may be further dispersed in above volume of aqueous liquid carrier.

The exact concentration of aurintricarboxylic acid compound to be employed in compositions for the treatment of growth media is not critical, provided that a minimum effective dosage is supplied in the media. The concentration of the aurintricarboxylic acid compound may vary from 0.01 percent by weight to 95 percent by weight of the composition, depending on whether the composition is a treating composition or a concentrate composition and whether it is in the form of a solid or liquid.

Liquid concentrate compositions commonly contain from 2 to 50 percent or more by weight of the aurintricarboxylic acid compound. These concentrate compositions are generally aqueous compositions although other solvents such as acetone, diisobutyl ketone, isopropyl alcohol, and petroleum may be employed as liquid carrier. Such concentrate compositions preferably contain fertilizer and may contain dispersing agents, emulsifying agents such as condensation products of alkylene oxides of phenols and organic acids, alkyl aryl sulfonates, polyoxyalkylene derivatives of sorbitan esters, complex ether alcohols, mahogany soaps and the like. Liquid concentrate compositions may be diluted to prepare treating compositions. Liquid treating compositions preferably contain from 0.01 to 10 percent by weight of the aurintricarboxylic acid compound.

Solid concentrate compositions commonly contain from 1 to 50 percent of the aurintricarboxylic acid compound. In such compositions, the aurintricarboxylic acid compound may be intimately dispersed with fertilizer or inert solid material such as solid surface-active dispersing agents, chalk, talc, pyrophyllite, attapulgite, fuller's earth, or bentonite. Such concentrate compositions may be further dispersed in fertilizer or other innocuous adjuvants to obtain treating compositions. When a fertilizer is used as carrier, the fertilizer may be organic or inorganic. Suitable fertilizers include phosphate containing fertilizers such as superphosphate fertilizers, mixed nitrogen-phosphorus-potassium fertilizers, ammonium nitrate and organic fertilizers. Solid treating compositions preferably contain from 0.1 to 25 percent by weight of the aurintricarboxylic acid compound. Furthermore, the solid concentrate compositions may be dispersed in water with or without added dispersing agent or agents to prepare aqueous soil treating compositions as previously described.

The preferred embodiment of the present invention comprises distributing the aurintricarboxylic acid compound in a phosphate-containing fertilizer composition. Such compositions may contain the aurintricarboxylic acid compound in from 0.5 to 20 percent by weight based on the weight of phosphorus in the fertilizer when the latter is calculated as phosphorus pentoxide.

In carrying out the operations in accordance with the present invention, an aurintricarboxylic acid compound or a composition containing an aurintricarboxylic acid compound is distributed in any suitable fashion in soil or other growth media, such as by simply mixing with growth media, by applying as a band beneath the seed row, by applying to the surface of soil and thereafter dragging or discing into the soil to the desired depth, or by employing a liquid carrier to accomplish the penetration and impregnation. The application of the spray and dust compositions may be carried out by conventional methods, e.g., with power sprayers or dusters, boom and hand sprayers, etc. Further, the distribution may be accomplished by introducing the aurintricarboxylic acid compound into the water employed to irrigate the soil. If desired, the unmodified material may be employed, but generally a liquid or solid carrier composition containing the aurintricarboxylic acid compound is applied to the growth medium.

The following examples illustrate the invention but are not to be construed as limiting.

EXAMPLE 1

An aqueous nutrient treating composition containing labeled phosphoric acid was prepared by intimately mixing 45 parts by weight of aurintricarboxylic acid, 510 parts by weight of labeled phosphoric acid ($H_3P^{32}O_4$), 322 parts by weight of ammonium nitrate and 60,000 parts by weight of water.

Six 10 milliliter aliquots of each of the compositions thus prepared were applied as a drench to pots containing 150 grams of soil having three tomato plants of about 2 inches in height growing therein. After treatment, the soil contained the following concentration of materials on a dry weight basis.

| Material: | Parts by weight per million parts by weight of soil |
|---|---|
| Aurintricarboxylic acid | 50 |
| Labeled phosphoric acid ($H_3P^{32}O_4$), calculated as $P_2O_5$ | 375 |
| Ammonium nitrate, calculated as nitrogen | 125 |

A check treatment was carried out in a similar manner employing a nutrient composition containing no aurintricarboxylic acid.

The plants were allowed to grow for two weeks after treatment and the aerial portions then harvested. The harvested plants were then dried. The entire aerial portions of the plant were then pressed into planchets with a 2-ton press for making a count of radioactive phosphorus. From the unit weight of the sample and the total weight of harvested portions of the plant, the total uptake of radioactive phosphorus was determined, according to a method similar to that described by A. F. MacKenzie and L. A. Dean in Analytical Chemistry, 22, 489–490 (1950). From the averages, total uptake of the radioactive phosphorus in six samples treated with the aurintricarboxylic acid and the averages of the total uptake in the check determinations, the percent increase in phosphorus uptake by plants grown on soil treated with said aurintricarboxylic acid compound over the untreated check plants were calculated.

The operations were carried out simultaneously employing different types of soil. The results were as follows:

*Table I*

| Soil | Percent Increase in Phosphorus Uptake |
|---|---|
| Slightly saline, high organic matter (9.3 percent), acid (pH 5.6), loam | 54 |
| Slightly saline, low organic matter (1.9 percent), alkaline (pH 7.7), slightly calcareous (2.3 percent calcium carbonate), sandy loam | 28 |
| Highly saline, low organic matter (1.3 percent), alkaline (pH 7.4), non-calcareous, sandy loam | 25 |
| Low organic matter (0.6 percent), acid (pH 5.8), sandy loam | 18 |
| Low organic matter, slightly acid (pH 6.6), clay loam | 13 |

EXAMPLE 2

In a similar manner, a treating composition was prepared in which triammonium aurintricarboxylate was employed instead of aurintricarboxylic acid. The treating compositions as well as a check were applied as drench at a rate described in Example 1 to pots containing 150 grams of calcareous soil having a pH of 8, and thereafter planted with tomato plants, the plants allowed to grow, then harvested and determinations made on total uptake of radioactive phosphorus as previously described. It was found that the percent uptake of radioactive phosphorus by plants grown on soil treated with triammonium aurintricarboxylate over the check plants was 31 percent.

EXAMPLE 3

A modified fertilizer composition is prepared by intimately mixing 5.73 grams of commercial triple superphosphate (0-45-0) fertilizer with 0.26 gram of aurintricarboxylic acid. In this and subsequent fertilizer compositions, the values in the parenthesis indicate the available component as follows: (N—P₂O—₅K₂O). This corresponds to administration of 75 pounds of phosphorus pentoxide plus 7.5 pounds of aurintricarboxylic acid per acre. The above composition is uniformly distributed in a band application along the bottom of a 2½ inch deep furrow in a seed plot of alkaline clay soil.

In simultaneous operations, 5.73 grams (corresponding to 75 pounds phosphorus pentoxide per acre) of unmodified commercial triple superphosphate (0-45-0) fertilizer and 11.46 grams (corresponding to 150 pounds phosphorus pentoxide per acre) of unmodified commercial triple superphosphate (0-45-0) fertilizer are distributed in other 2½ inch deep furrows as checks.

About 2 inches of soil is then placed in the furrows and tomato seeds are then planted therein and covered with about ½ inch of soil. The seeds are then allowed to sprout and as soon as the true leaves have started to form on the tomato seedlings, the tomato plants are thinned to about 24 plants per 18-inch row. About five weeks later, the plants are harvested and determinations made on the phosphorus uptake by the plants. The analysis for phosphorus is carried out chemically by digesting the harvested plant with nitricperchloric acid mixture according to a method similar to that described on page 294 of "Soil and Plant Analysis," by C. S. Piper, Interscience Publishers, Inc., New York, 1944. The solutions resulting from the digestion are then analyzed for phosphorus employing the phosphomolybdate blue method as described by S. R. Dickman and R. H. Bray in Industrial and Engineering Chemistry, Analytical Edition, 12, 665-668 (1940).

The results of these determinations show that the phosphorus uptake of the plants treated with a fertilizer composition modified with aurintricarboxylic acid is greater than that of plants treated with twice the amount of phosphate fertilizer.

EXAMPLE 4

Modified fertilizer compositions containing various aurintricarboxylic acid compounds are prepared as follows:

Composition I:                             Parts by weight
    Triple superphosphate (0-45-0) _____ 2222
    Aurintricarboxylic acid _____  100
Composition II:
    Triple superphosphate (0-45-0) _____ 2222
    Triammonium aurintricarboxylate _____  100
Composition III:
    Superphosphate (0-19-0) _____ 5270
    Aurintricarboxylic acid _____  100
Composition IV:
    "Ammo-phos fertilizer" (16-20-0) _____ 5000
    Triammonium aurintricarboxylate _____  100
Composition V:
    "10-10-10 fertilizer" (10-10-10) _____ 10,000
    Aurintricarboxylic acid _____  100

These compositions are uniformly distributed in separate operations in band applications at a rate corresponding to 75 pounds of phosphorus pentoxide plus 7.5 pounds of aurintricarboxylic acid compound per acre and thereafter planted with tomato seeds. Check operations are simultaneously carried out by applying (a) the same amount of fertilizer and (b) double the amount of fertilizer but in each case omitting the aurintricarboxylic acid compound. After about six weeks the plants are harvested and determined for phosphorus uptake by chemical analysis. The results show that all of the plants grown on soil treated with modified fertilizer compositions have a phosphorus uptake equal to or greater than that obtained by doubling the amount of fertilizer.

EXAMPLE 5

An aqueous dispersion was prepared having the following composition.

Component:                    Parts by weight per million parts
                              by weight of aqueous dispersion
    Aurintricarboxylic acid _____  750
    Ammonium nitrate _____ 5400
    85 percent phosphoric acid
        (sp. gr., 1.7) _____ 8500

The modified fertilizer composition thus prepared was applied as drench to pots containing tomato plants growing in 150 grams of soil in an amount sufficient to supply the following concentration of materials on a dry weight basis.

Component:                    Parts by weight per million parts by weight of soil
    Aurintricarboxylic acid _____  50
    Ammonium nitrate (calculated
        as nitrogen) _____ 125
    Phosphoric acid (calculated
        as P₂O₅) _____ 375

For check treatment, similar pots containing tomato plants were fertilized with a similar composition but containing no aurintricarboxylic acid compound at a rate of 75 pounds of phosphorus pentoxide per acre (equal to 375 parts by weight of phosphorus pentoxide per million parts by weight of soil).

The plants were allowed to grow for two weeks after treatment and the aerial portions of the plants were harvested, dried and the dried weights compared with the check determination at a rate of 75 pounds of phosphorus pentoxide per acre. It was found that the plants grown on soil treated with the modified fertilizer composition containing aurintricarboxylic acid had 25 percent greater weight than the plants grown on soil with unmodified fertilizer composition.

I claim:

1. In agronomical practice, a method for enhancing plant growth which comprises adding to plant growth medium an aurintricarboxylic acid compound having the formula

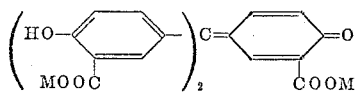

wherein M is selected from the group consisting of hydrogen and ammonium, wherein the aurintricarboxylic acid compound is added in an amount to give a concentration of from about 0.25 part to about 250 parts by weight per million parts by weight of growth medium.

2. A method for enhancing the phosporus uptake from plant growth medium by plants which comprises dispersing through said growth medium an aurintricarboxylic acid compound having the formula

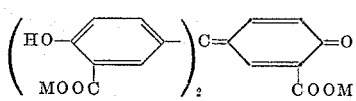

wherein M is selected from the group consisting of hydrogen and ammonium and wherein the aurintricarboxylic acid compound is added in an amount sufficient to give a concentration of from about 0.25 part to about 250 parts by weight per million parts by weight of growth medium.

3. A method according to claim 2 wherein the aurintricarboxylic acid compound is aurintricarboxylic acid.

4. A method according to claim 2 wherein the aurintricarboxylic acid compound is triammonium aurintricarboxylate.

5. A method for treating plant growth media to increase phosphorus uptake therefrom by plants which comprises introducing into plant growth media a composition comprising an adjuvant for treating growth media in intimate admixture with an aurintricarboxylic acid compound having the formula

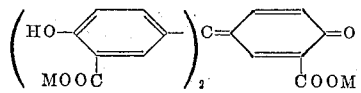

wherein M is selected from the group consisting of hydrogen and ammonium and wherein the aurintricarboxylic acid compound is added in an amount sufficient to give a concentration of from about 0.25 part to about 250 parts by weight per million parts by weight of growth media.

6. A method according to claim 5 wherein the growth medium treating adjuvant is a phosphate containing fertilizer composition.

7. In the fertilization of plant growth media with a phosphate-containing fertilizer, the step which comprises supplying to plant growth media substantially simultaneously with the phosphate-containing fertilizer an aurintricarboxylic acid compound having the formula

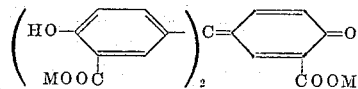

wherein M is selected from the group consisting of hydrogen and ammonium and wherein the aurintricarboxylic acid compound is added in an amount sufficient to give a concentration of from about 0.25 part to about 250 parts by weight per million parts by weight of growth media.

References Cited in the file of this patent

UNITED STATES PATENTS

| | | |
|---|---|---|
| 1,947,320 | Truffaut et al. | Feb. 13, 1934 |
| 2,190,890 | Sellei | Feb. 20, 1940 |
| 2,870,037 | Converse | Jan. 20, 1959 |

OTHER REFERENCES

Wey, in "Chemical Abstracts," vol. 50, col. 82–87 (h), 1956.